United States Patent [19]
Arnone et al.

[11] Patent Number: 5,913,966
[45] Date of Patent: Jun. 22, 1999

[54] STEAMER PAN HAVING A CHORD TRUNCATED CIRCULAR SHAPE

[76] Inventors: Guido A. Arnone; Kirsten Schjören-Arnone, both of 3553 Lake Austin Blvd. Apt. E, Austin, Tex. 78703

[21] Appl. No.: 08/751,551

[22] Filed: Nov. 18, 1996

[51] Int. Cl.⁶ ..................................................... A47J 37/12
[52] U.S. Cl. ................................ 99/413; 99/410; 99/411; 126/369
[58] Field of Search ............................... 99/410, 411, 412, 99/413, 414, 416, 339, 422; 126/373, 369

[56] References Cited

U.S. PATENT DOCUMENTS

| | | |
|---|---|---|
| 345,307 | 7/1886 | Jones . |
| 540,852 | 6/1895 | Cheney . |
| 549,503 | 11/1895 | Dom . |
| 2,404,130 | 7/1946 | Frank ..................................... 99/413 X |
| 2,932,293 | 4/1960 | Rassieur .................................. 126/369 |
| 3,741,427 | 6/1973 | Doyle ........................................ 220/13 |
| 4,138,939 | 2/1979 | Feld ........................................ 99/418 |
| 4,331,127 | 5/1982 | Grosso .................................... 126/377 |
| 4,397,298 | 8/1983 | Abell ...................................... 126/369 |
| 4,452,581 | 6/1984 | Panehal ................................... 425/464 |
| 4,646,628 | 3/1987 | Lederman ................................. 99/413 |
| 4,714,012 | 12/1987 | Hernandez ................................ 99/444 |
| 4,735,135 | 4/1988 | Walker ..................................... 99/424 |
| 4,739,698 | 4/1988 | Allairp ..................................... 99/410 |
| 5,211,105 | 5/1993 | Liu .......................................... 99/446 |
| 5,275,094 | 1/1994 | Naft ..................................... 99/411 X |
| 5,402,714 | 4/1995 | Deneault et al. ......................... 99/416 |
| 5,511,466 | 4/1996 | Dzibinski ................................. 99/339 |

FOREIGN PATENT DOCUMENTS

| | | |
|---|---|---|
| 964878 | 3/1975 | Canada .................................... 99/242 |
| 2493-126 | 5/1982 | France . |
| 351008 | 8/1937 | Italy ..................................... 126/373 |
| 558422 | 3/1957 | Italy . |
| 55313 | 7/1952 | Sweden . |
| 3681 | 4/1891 | Switzerland ........................... 126/373 |
| 198 578 | 6/1923 | United Kingdom . |

OTHER PUBLICATIONS

Consumer Reports, Dec. 1995.
Catalog 1996/1997 Cook's Corner Omelet/Divided Fry Pan.
Catalog For Cooks Dec./1996 Williams Sonoma #67–1051051.
Catalog Winter/1997 Improvements Half Grill Kit.

*Primary Examiner*—Reginald L. Alexander

[57] ABSTRACT

The preferred embodiment comprises an improved pan (20) (FIG. 1) that can also be used as a steaming utensil on top of an ordinary pot; the pan comprises a receptacle (30) that has a flat bottom (32) and a side wall (34) whose top edge has a chord-truncated circular shape and a flange (42). The area defined by the chord-truncated circular shape is made as large as desired without voiding access to the pot below and without increasing the predetermined radius of the receptacle. The above preferred embodiment can also have a multiplicity of holes (33) in the bottom (FIG. 9). The preferred embodiment is not restricted to an outer pot of given radius; it can be used on top of a variety of pots with radii within a determined range. The combination of the pan and the pot below behaves effectively as a double-compartment vessel. If the lid of the pot below is placed on top of the flange, the steam is substantially diverted toward the receptacle. Thus, the non-perforated preferred embodiment supersedes conventional pans and steamers by giving substantially identical performance thereover while additionally having: (a) a unique, eye-catching design, (b) the functionality of a double-boiler (careful heating of sauces or steaming of vegetables in the receptacle while boiling another substance in the pot below), and (c) an optimal capacity without voiding access to the pot below. In spite of its novel form, all the above multi-functionality is embedded within the familiar shape of a pan. The simple, yet unique, design of the invention, together with its universality of use, has important implications for the marketing of cookware sets whose pan of smallest capacity has been substituted by the pan of the present invention.

25 Claims, 7 Drawing Sheets

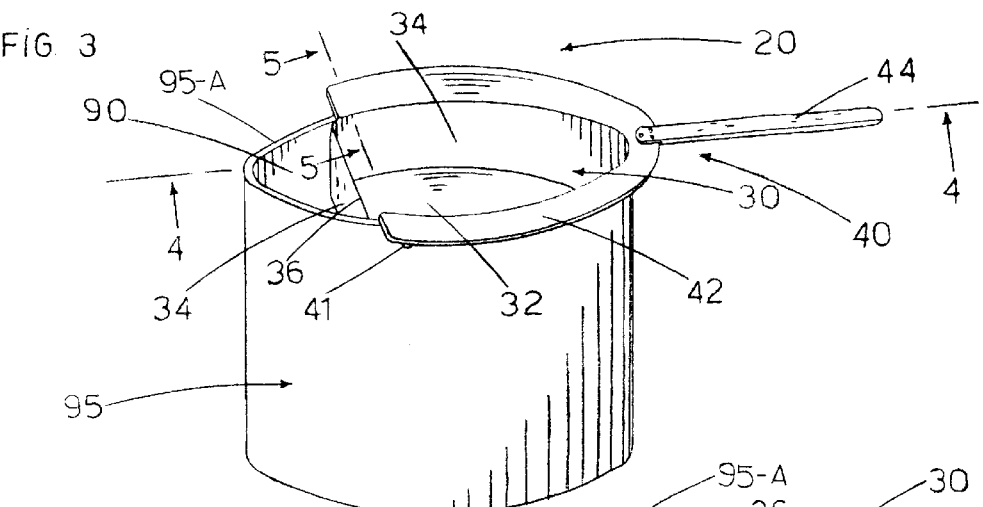
FIG. 3
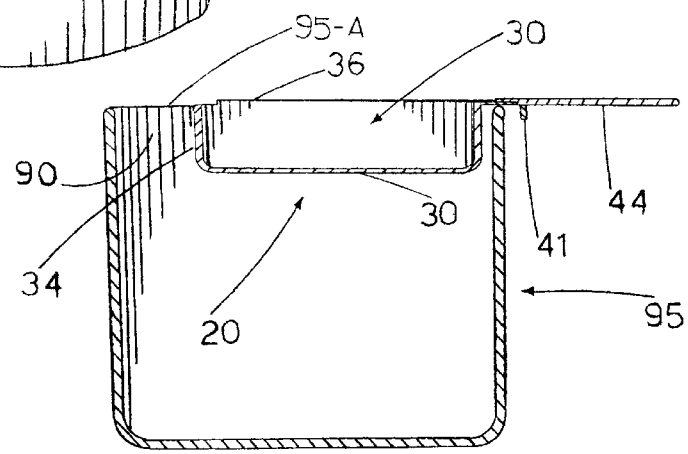
FIG. 4
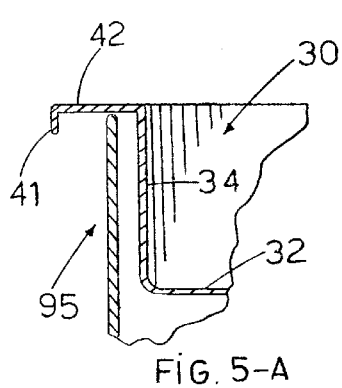
FIG. 5-A
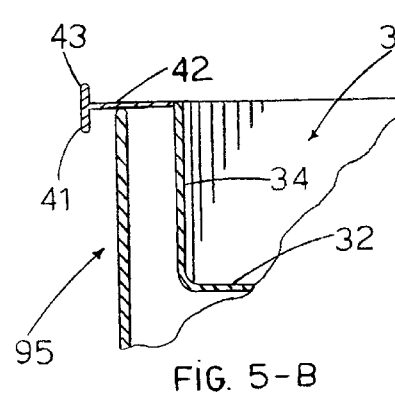
FIG. 5-B
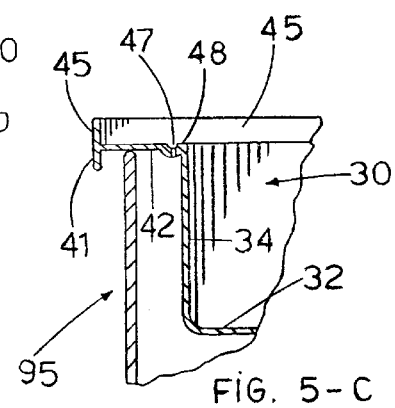
FIG. 5-C

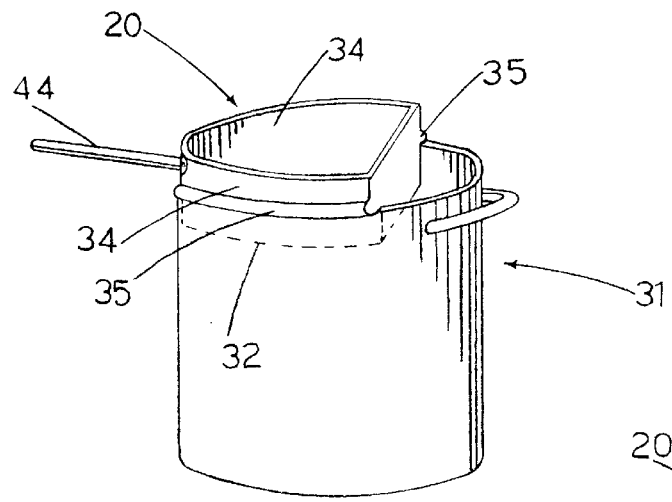
FIG. 6-A
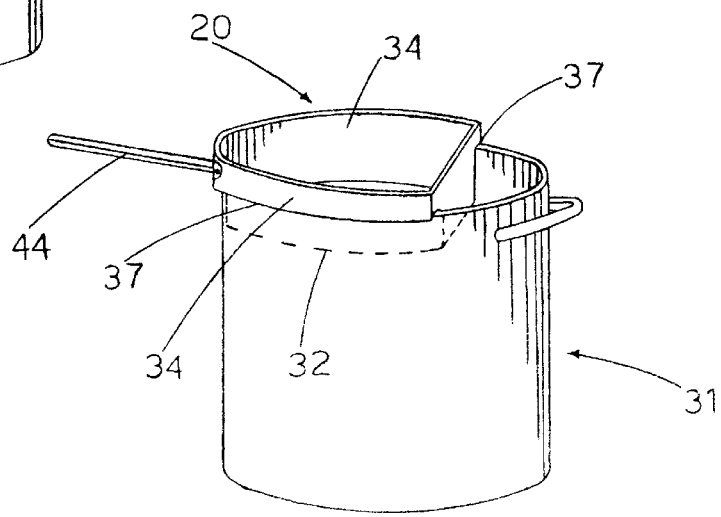
FIG. 6-B
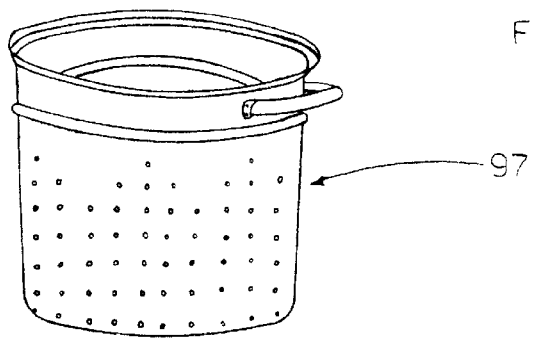
FIG. 7

STEAMER PAN HAVING A CHORD TRUNCATED CIRCULAR SHAPE

BACKGROUND—FIELD OF INVENTION

This invention relates generally to cooking utensils; particularly, it relates to pans and steaming utensils for heating edible substances.

BACKGROUND—DISCUSSION OF PRIOR ART

Cooking by steam is a process where the final state of the edible substances being cooked differs substantially from the final state that otherwise would be obtained by using another cooking method, such as baking or boiling. These last two processes tend to modify substantially the structure of the food being cooked as cellular membranes break and the water solution content within the cell is either evaporated or added to the boiling water. Hence, if one wants to preserve nutrients, flavor, and consistency in the substance being cooked, steaming is the method of choice, particularly in the case of vegetables. Also, among the above three methods, steaming is the one that is most easily carried out in a slow, careful manner, thereby lowering substantially the risk of burning or over looking. The preparation of sauces and other semi-liquid edible substances are one instance where cooking must be as slow as possible in order to prevent flavor alterations.

In steam cooking utensils, steam generated in an ordinary pot conveys heat to substances placed in the utensil, which usually rests on top of such pot. In most steamers, the steam passes through a multiplicity of holes before reaching the food; examples of perforated-type steamers are found in the U.S. Pat. Nos. 540,852 to Cheney (1895); 2,404,130 to Frank (1946); 2,932,293 to Rassieur (1960); 4,138,939 to Feld (1979); 4,739,698 to Allaire (1988); 5,275,094 to Naft (1994); and in Canadian Pat. No. 964,878 to Ludena (1975). On the other hand, there are other steaming utensils where the steam is used to warm the utensil and subsequently the food without direct application of steam onto the food. Examples of such steamers or double boilers, which are intended to warm semi-liquid foods (substances with at least one liquid phase), are presented in the U.S. Pat. Nos. 3,741,427 to Doyle (1971); 4,646,628 to Lederman (1987); and in the following foreign patents: Swiss Pat. No. 3681 to Wetscherek (1891); Swedish Pat. No. 55,313 (1922) to Fridolf; Italian Pat. No. 351008 to Gruber (1937); Italian Pat. No. 558,422 to Delia (1957); and French Pat. No. 2493-126 to Idot (1982). U.S. Pat. Nos. 4,397,298 to Abell (1983) and 4,331,127 to Grosso (1982) can use both approaches.

Some steaming utensils save space and energy by using multiple compartments to cook separate foods simultaneously; see Lederman's and Gruber's utensils, for example. These advantages are convenient in situations where the number of ranges available are limited, like during the preparation of large meals (for example, Thanksgiving), camping (where almost always there is only one range available per stove), or cooking with stoves of only two ranges (typical in the low-income segment of the world's population). Furthermore, cooking utensils with multiple compartments are also useful in households where energy bills can present a non-negligible part of the corresponding income.

On the other hand, the above utensils have at least one of the following main limitations:

(0) Steaming utensils cannot be used as pans, and vice-versa (1) Steaming utensils and top pots void access and visibility to the pot below; it is not possible, or impractical at best, to cook food in the underlying pot:

(1.1) It is not possible, in an effective and convenient manner, to stir food being cooked in the underlying pot without previously removing the steaming utensil.

(1.2) It is not possible to boil food in the underlying pot for relatively large time intervals at relatively high cooking power without running a high risk of fluid overflow.

(1.3) It is not possible, in an effective and convenient manner, to add food to the underlying pot without previously removing the steaming utensil.

(1.4) It is not possible, in an effective and convenient manner, to poke or test for tenderness the food being cooked in the underlying pot without previously removing the steaming utensil.

(2) The steaming utensil does not have the flexibility to be placed on top of any pot of typical size in a mechanically stable manner; that is, it is intended to fit only one given pot.

(3) The steaming utensil consists of many parts, which make the utensil impractical or cumbersome.

(4) Steaming utensils or receptacles that do not void access to the pot below do not have an optimal capacity.

In both Naft's and Grosso's combination devices, for example, it is impractical to cook food in the underlying or outer pot while simultaneously steaming a substance in the inner or top pots. Therefore, the outer pot and the water are used only as an intermediate stage in the beating of the inner pots with the consequent waste of space available for cooking food. Frank's steamer, for example, voids access and visibility to the pot below; to gain such access, the steamer must be previously removed. None of Wetscherek's, Lederman's, or Gruber's receptacles have the largest possible carrying capacity without voiding access to the pot below. Furthermore, both Gruber's and Lederman's combinations of rack and pots cannot be placed on top of any pot, but only on a given pot of predetermined dimensions. Likewise, in Grosso's device, the inner pot is designed to fit a given companion outer pot; that is, it is not intended to fit a range of pots with different diameters. In both Lederman's and Gruber's devices, the combination of a plurality of pots and a rack is impractical. Likewise, both Naft's and Grosso's devices lack simplicity since both have many parts. Finally, none of the above cooking utensils can be used as a pan.

In addition to the formerly stated main disadvantages, there are other disadvantages inherent to whether or not the utensils have a perforated bottom:

(5a) The utensils of the prior art that have a multiplicity of holes cannot be used to heat semi-liquid substances.

(5b) Likewise, those utensils (with a non-perforated bottom) that are used to warm semi-liquid substances do not allow steaming of substances that tend to preserve their shape and integrity.

In other words, most of the steaming utensils of the prior-art do not give the cook the flexibility to choose either direct application of steam onto the food being heated or indirect heating of the semi-liquid food held in there.

Instances in which the above limitations become apparent to the cook are:

Warming pasta sauce, initially at refrigerator temperature, using the steam that comes from the underlying pot where the pasta is simultaneously being cooked. Pasta cooking needs frequent stirring and requires being cooked at a relatively high power for at least eight minutes. This makes inconvenient the use of a double-boiler insert to warm the sauce by heating the insert with steam coming from the pot because of the high risk of spilling. Furthermore, if the sauce is warmed in a separate pot or pan, two ranges are used: one to cook the pasta, the other to warm the sauce. Clearly, it is desirable to be able to use only one range to do both operations simultaneously. Again, this cannot be accomplished by a double-boiler insert because of the above reason. Furthermore, when the sauce is warned in a separate pot, it is not uncommon to get the sauce overcooked, specially the one located near the bottom of the pot. This would not occur using steam cooking, but even if the spilling problem was not present, one still would not be able to stir the pasta as frequently as desired without removing the insert.

Melting butter, and careful warming of sauces, gravy, previously cooked soups (either canned or home-made), and the like while simultaneously cooking substances that require being boiled for at least several minutes. Such substances include, to mention further examples, potatoes, beans, some types of rice, grains, some vegetables, beef, and poultry. In these situations, where steam cooking is preferable, the cook runs the risk of water spilling if the pot is kept covered with the top pot of a double boiler. Also, it is not possible to stir the food in the pot without lifting the top pot Finally, one can solve the former problems by the use of a double-boiler on top of one burner, and a pot placed on top of another burner, but this solution requires two burners instead of only one.

Most double-boiler tops or inserts fit only one predetermined size of the pot underneath. If the companion pot is currently dirty, one can not use the insert without previously cleaning the pot. Another available pot, clean at the moment one needs to use the insert, cannot be used unless the insert fits in it. Thus, the cook is constrained to use the insert only with a given companion pot Furthermore, such inserts have the disadvantage that the pot underneath remains completely covered when the insert is on top of it with the concomitant risk of spilling and lack of ability to stir without removing the insert.

Steaming utensils that comprise more than two parts typically occupy more space in the dishwasher and the kitchen cabinets than otherwise necessary.

OBJECTS AND ADVANTAGES

Accordingly, several objects and advantages of our invention are:

(0) to provide a new and improved cooking utensil that has the flexibility to be used either as a pan, or as a double-boiler insert to heat semi-liquid foods, or as a steamer to heat solid foods;

(1) to provide a cooking utensil that gives access and visibility to the pot below when used as a steamer or top pot, thereby making possible, in a practical manner, to boil food in the pot while steaming another in the utensil:

(1.1) to provide a cooking utensil that allows boiling food in the underdlying pot while at the same time being able to stir such food in an effective manner, as frequently as desired, and without the need of removing the utensil placed on top of such pot;

(1.2) to provide a cooking utensil that allows boiling food in the underlying pot for prolonged periods of time with a substantially low and controllable risk of spilling;

(1.3) to provide a cooking utensil that allows the cook to add food to the underlying pot without the need of removing the utensil placed on top of such pot; and (1.4) to provide a cooking utensil that allows the cook to poke (or test for tenderness) the food in the underling pot without the need of removing the utensil placed on top of such pot;

(2) to provide a cooking utensil that can be used on top of most currently available mid to large size pots and that is mechanically stable against small relative motions of the utensil with respect to the pot;

(3) to provide a cooking utensil that has a simple and appealing design and that is easy, convenient, and safe to handle;

(4) to provide a cooking utensil with an optimal capacity without voiding access to the pot below when used as a steamer or top pot; and, (5) to provide a cooking utensil that can be flexibly used for steam cooking either solid edible substances (vegetables and the like) or semi-liquid ones (sauces and the like).

Other objects of our invention are:

to provide a cooking utensil that when placed on top of a typical pot saves energy and space by allowing heating an edible substance placed in the utensil while simultaneously boiling another in the pot underneath powered by only one range;

to provide a cooking mini-utensil that allows most of the previous advantages when cooking outdoors in a camping situation where usually there is only one gas stove available;

to provide a steamer pan whose use allows slow warming of gravy, sauces, butter, and like substances that need careful heating in order to substantially reduce the risk of undesired alteration in flavor and of splashing the stove's top if used uncovered;

to provide a steamer pan capable of warming about 650 ml. of tomato sauce from about 10° C. up to about 40° C. during a steaming time of about 10 minutes;

to provide a steamer pot capable of warming previously cooked soup; and, to provide a cooking utensil that can be reasonably priced when mass produced.

Further objects and advantages are to provide a cooking utensil that can be used, if desired, as the top pot of a double boiler by simply placing the utensil on top of an outer pot and covering the utensil with a lid (regardless of whether or not a substance is being cooked in the outer pot), and to provide a steaming utensil that can be used as an insert on top of a conventional pasta cooker, which typically comprises an outer pot, a colander insert, and a lid (the utensil may substitute the lid, for example).

Still further objects and advantages will become apparent from a consideration of the ensuing description and drawings.

DRAWING FIGURES

In the list below, closely related figures have been grouped together.

FIG. 3 is an isometric view of the steamer pan of FIG. 1 when in operation as a top pot.

FIG. 4 is a cross-sectional view along line 4—4 of FIG. 3.

FIG. 5A is a cross-sectional view along line 5—5 of FIG. 3.

FIG. 5B is a minor variant of the view shown in FIG. 5A.

FIG. 5C is the groove variant of the view shown in FIG. 5A.

FIG. 6A and 6B show two variants of a set version of the preferred embodiment, where the utensil further comprises an outer pot, FIG. 7 shows an isometric view of a colander insert of a typical pasta cooker.

Figure 1:
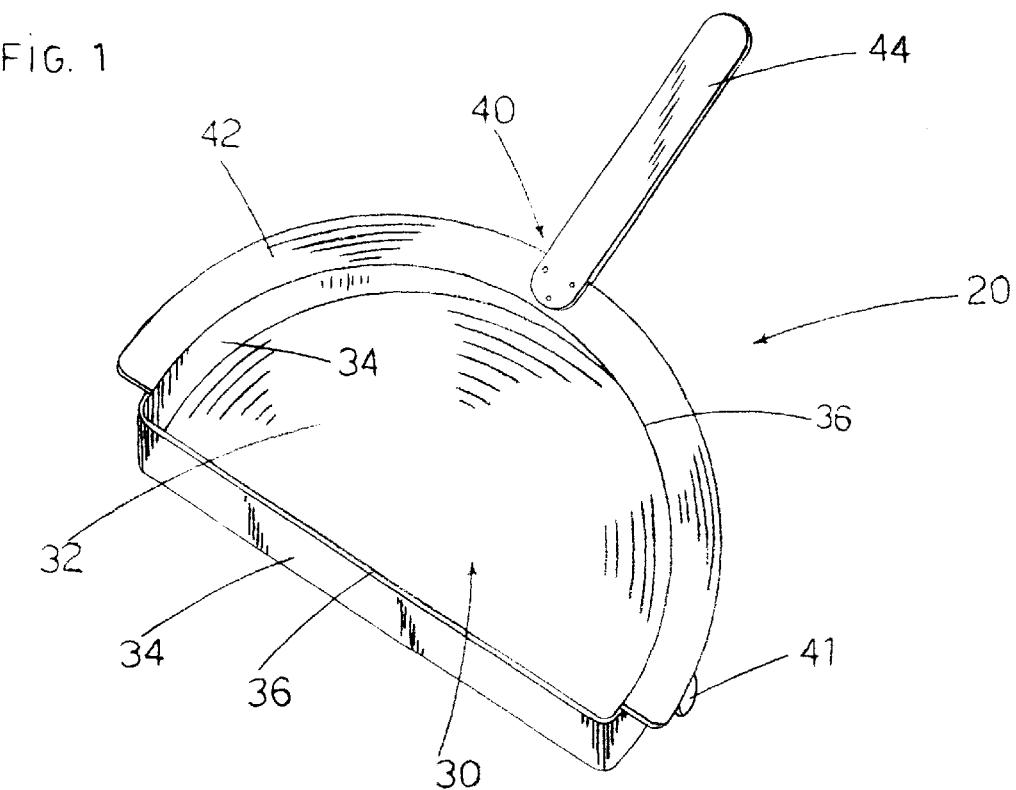
FIG. 1 is an isometric view of the preferred embodiment of a steamer pan according to our invention.

REFERENCE NUMERALS IN DRAWINGS 20 cooking utensil
26 lid of utensil
30 food-holding receptacle
  32 bottom wall or bottom
    31 congruent pot
    33 multiplicity of holes
  side wall or wall
    35 bulge
    37 strep-like inverted ledge
    38 two-step scale
    39 cylindrical voids
40 brace
  42 flange
    41 downside protuberances
    43 upside protuberances
    45 upside edge
    47 sulcus
      48 drain holes
  44 handle
50 enclosing brace
  52 enclosing wall
  54 lip
  55 void
  56 flange
60 perforated removable receptacle
non-perforated removable receptacle
  64 ears
  65 handle
  66 rim
80 U-bracket
90 steam passageway
95 ordinary pot
  96 lid of pot
  97 colander insert
100 cookware set

SUMMARY OF THE INVENTION

In accordance with the present invention, we provide a new and improved cooking utensil comprising a receptacle having a chord-truncated circular shape with a predetermined radius. The utensil also comprises support means so that the utensil can be placed on top of a pot in a mechanically stable manner, yet the radius of such pot is not necessarily restricted to be equal to the radius of the receptacle. Thus, when the utensil is placed on top of an ordinary pot, such pot remains partially uncovered. Furthermore, without voiding the above access and without increasing the predetermined radius, the area of the chord-truncated circular shape is made as large as desired—hereby optimizing the capacity of the utensil. When the utensil has a non-perforated bottom, the utensil can be flexibly used either as a pan or as a steaming utensil—with all the advantages of steam cooking and without voiding access to the pot below.

Figure 2:
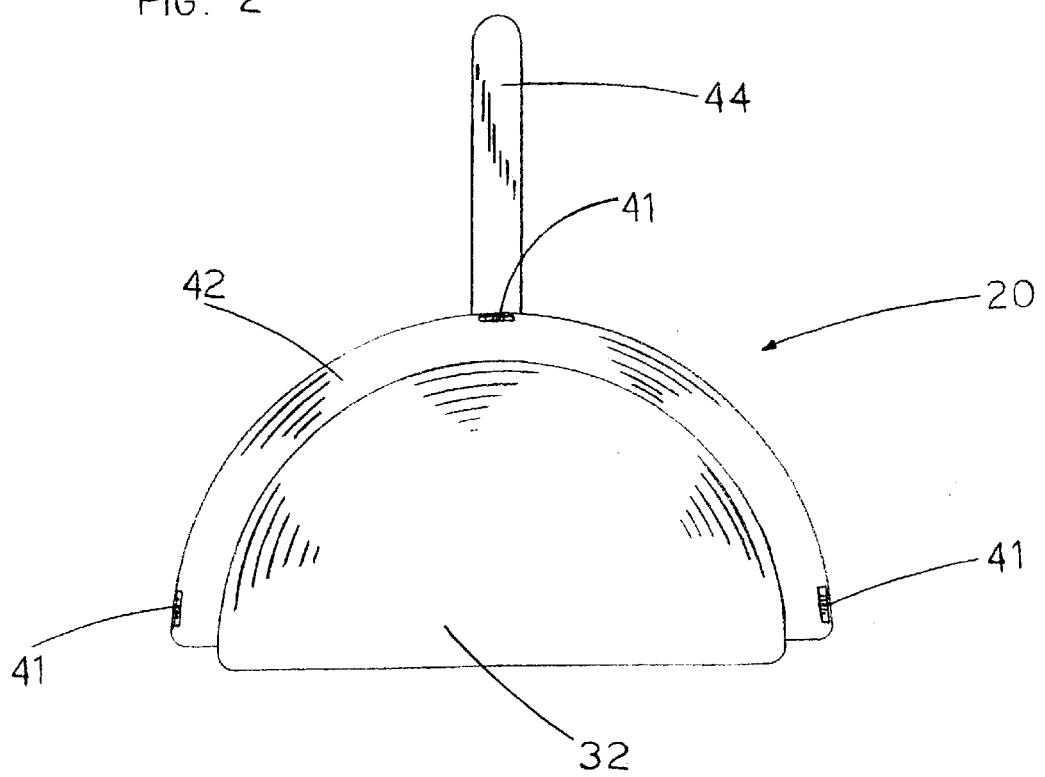
FIG. 2 is a bottom view of the steamer pan of FIG. 1.

Structure of the Preferred Embodiment—FIGS. 1 and 2

FIG. 1 shows an isometric view of the preferred embodiment of a cooking utensil 20 of the present invention. Utensil 20 comprises a food-holding receptacle 30 and a support or brace 40. A flat bottom wall 32 and a vertical side wall 34 integrally form receptacle 30 while brace 40 comprises a flange, rim, or salient 42 and a handle 44. Handle 44 is connected to flange 42, which is integrally formed with wall 34. Bottom 32, wall 34, flange 42, and handle 44 all have substantially the same thickness.

Bottom 32 has a chord-truncated circular shape whose area can be either equal to or larger than the area of the corresponding semicircle of the same radius. Wall 34 has a uniform height and extends along the whole perimeter of bottom 32. Flange 42 is a truncated annulus that runs along most of the curved portion of, projects radially outwards from, and is integrally formed with the top edge of wall 34.

FIG. 2 shows the corresponding bottom view of utensil 20. Handle 44 has a uniform width preferably equal to the uniform width of flange 42. It lies substantially in the same plane defined by flange 42, and preferably is connected to such flange so that the bottom view of utensil 20 has an axis of symmetry that runs along the middle longitudinal axis of handle 44. Flange 42 has three downside protuberances 41 located in the radially outermost part of its under surface and preferably positioned so that the above symmetry is preserved Furthermore, these protuberances preferably have a semi-circular shape, are orthogonal to the above under surface, and are oriented tangentially to such edge.

Utensil 20 is lightweight and self-supporting. Preferably, it is made of thin-gauge sheet metal such as stainless steel or aluminum. It can also be made of a plurality of layers of such metals that may also include one or more copper layers instead of or in addition to the aluminum layers. The thickness of utensil 20 should be smaller than about 1.6 mm.

(1/16") if the utensil is made of sheet-metal stainless steel. The height of wall 34, the radius of bottom 32, and the width of flange 42 bear a direct relationship with the operation of utensil 20; therefore, we specify these dimensions in the next section. At last, the size of the protuberances is preferably about 0.3–0.6 cm. (1/8"–1/4").

Operation of the Preferred Embodiment—FIGS. 3, 4, and 5A

FIG. 3 shows a perspective view of the utensil when placed on top of an ordinary pot 95, which can be any commercially available pot whose height and radius are within given target ranges determined by the manufacturer. Receptacle 30 is intended for holding a semi-liquid food (a sauce, for example) that the cook wants to warm using the steam coming from pot 95 where the cook happens to be simultaneously boiling a substance (pasta, for example). The chord-truncated shape of bottom 32 causes a space, steam passageway, vent or void 90 to exist between the flat portion of wall 34 and that portion of the wall of pot 95 not covered by the utensil; hence, steam can escape out of the pot through passageway 90. Thereby, by adjusting the power delivered by the underlying range (not shown) but still keeping the contents of pot 95 in a boiling state, the cook can control the undesired effect of fluid overflow that otherwise would occur if pot 95 were completely covered by either a lid or another pot congruent thereto. Furthermore, passageway 90 also allows the cook to stir the contents of pot 95 without previously removing the utensil. Moreover, it also allows the cook to add salt, spices, and the like, and other ingredients to pot 95 at any time during the boiling without removing the utensil.

FIG. 4 shows the corresponding cross-sectional view along line 4—4 of FIG. 3. The typical height of pot 95 is larger than or equal to about 10 cm or 4". Therefore, the height of wall 34 should be about 4 cm. (1½") so that there is enough room between bottom 32 and the bottom of pot 95 to place the substance to be boiled, together with an adequate amount of water. However, one can also make the utensil more pot-like than pan-like; in this case, the height of wall 34 should be about 8 cm. or 3". Such pot-like utensil is useful to warm about three or four servings of condensed canned soup (plus the corresponding amount of water), for example. Obviously, such a pot-like utensil is restricted to be used on top of pots whose height is at least 15 cm., approximately. On the other hand, a pan-like one is preferable in the case of sauces, butter, gravy, and the like.

A semi-circular shape for bottom 32 simultaneously maximizes its area and the area of passageway 90. However, note that FIGS. 3 and 4 show a utensil whose bottom 32 has an area larger than the semi-circular one. This is recommended in order to increase the surface area of bottom 32 at the expense of the area of passageway 90 as long as the benefits provided by the passageway are not compromised by such enlargement Hence, the area of bottom 32 should be larger than but not too different from the area of a semi-circular bottom of the same radius.

FIG. 5A shows a cross-sectional view taken along line 5—5 of FIG. 3. Flange 42 rests on top of the edge of the wall of pot 95. This supports the utensil on top of pot 95. Each of protuberances 41, together with wall 34, constraint eventual transverse displacements of the utensil with respect to pot 95.

The finite or non-negligible width of flange 42, as seen in FIG. 5A, allows a range of pots 95 with different diameters to fit under utensil 20. Typically, the mange of diameters of large commercially available home-use pots goes from about 20 to 30 cm. (8"to 12"), with the average radius closer to the lower limit of about 20 cm. than to the upper limit of about 30 cm. Thus, the radius of bottom 32 should preferably be smaller but substantially equal to half the lower bound of the predetermined range of diameters, in this case 10 cm. or 4". On the other hand, the preferable width of flange 42 should be about 3 to 4 cm. (1¼"to 1⅝"), although it can be as large as deemed convenient Note that the presence of flange 42 prolongs the time the steam remains in contact with wall 34 before it escapes through passageway 90. Consequently, there is a larger heat flux directed radially inwards along the whole curved portion of wall 34 than the flux we otherwise would have if flange 42 were absent Preferably, for the given suggested value of 4 cm. for the height of wall 34 and the suggested bottom radius of about 10 cm., the area of bottom 32 should be such that the volume capacity of receptacle 30 is about 750 ml., which corresponds to a measure of 3 cups. A utensil 20 with these dimensions, made of gauge 16 sheet-metal stainless steel 304, heats 650 ml. of tomato sauce from about 10° C. to a serving temperature of about 40° C. after about 10 minutes of boiling water in pot 95, provided the sauce is stirred manually by the cook a few times during the heating. This amount is enough for four large servings of pasta. In practice, the area of bottom 32 so obtained is such that the benefits provided by passageway 90 are not compromised.

Minor Variants of the Preferred Embodiment— FIGS. 5B and 5C

FIG. 5B shows a cross-sectional view of a minor modification of flange 42 shown in FIG. 5A. Three additional upside 43 are located on its top surface in a location opposite to downside protuberances 41. Protuberances 43 are intended to partially restraint a lid (not shown) of pot 95 if the cook places it on top of the flange.

FIG. 5C shows a cross-sectional view of another possible modification of flange 42 shown in FIG. 5A. An upside protruding edge or protuberance 45 of uniform height extends along all its radially outermost part, Furthermore, a sulcus or groove 47 of upward concavity, substantially uniform width and depth, and having a plurality of drain holes 48, runs adjacent and substantially equidistant to the radially innermost edge of the flange. This modification is intended to prevent condensed water on flange 42 to end within receptacle 30 in the event the lid (not shown) of pot 95 is placed on top of the utensil. To this effect, edge 45 prevents such water from falling outside the utensil while sulcus 47 acts as a sink to trap water that in the end will fall through the drain holes back into pot 95. Obviously, the area of each drain hole should be large enough to prevent undesired surface tension effects.

Set Variant of the Preferred Embodiment—FIGS. 6A, 6B, and 7

FIGS. 6A and 6B show two variants of the preferred embodiment when it comes in combination with a given pot 31 whose radius is congruent with the radius of bottom 32. Specifically, FIG. 6A shows a variant that substitutes the flange by a bulge 35 of uniform width that runs horizontally along the curved portion of wall 34. Bulge 35 protrudes radially outward, and its size in the radial direction is small compared to the radius of bottom 32 but large enough so that the sum of the bottom radius and such size is larger than the radius of pot 31. Furthermore, FIG.6A also shows that handle 44 is directly connected to wall 34. On the other hand, in FIG. 6B, instead of bulge 35, wall 34 has a step-like inverted ledge 37, so that the radius of pot 31 is larger than the radius of bottom 32, but smaller than the radius of a horizontal cross-section of wall 34 taken near its top edge. Ledge 37 can also have a sigmoid shape instead of a step-like shape. Both the sigmoid shape and the ledge shape are instances of outwardly swelling sigmoidal shapes or bulbs. Finally, FIG. 7 shows a conventional pasta colander insert 97. This colander combines with the utensils and pots shown in FIGS. 6A and 6B so that utensil 20 can be insetted on top of colander 97, which can be inserted into pot 31.

Figure 8:
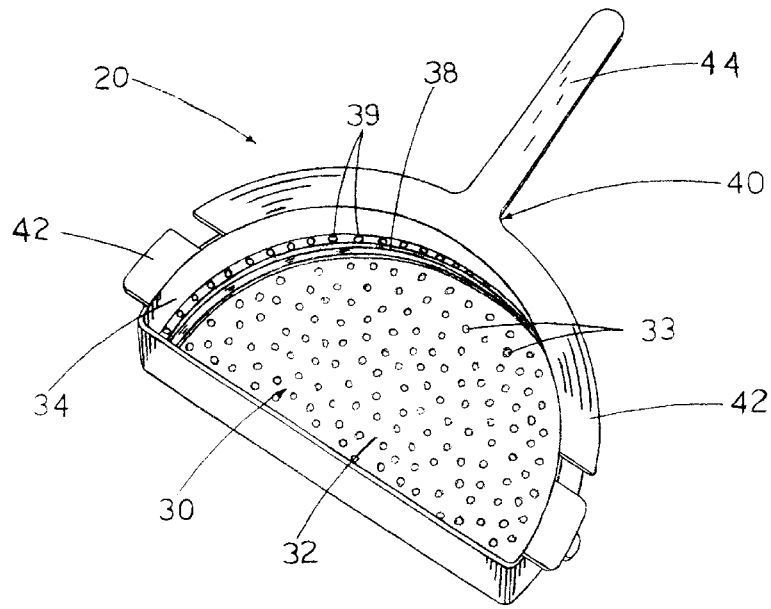
FIG. 8 is an isometric view of a main component of a perforated preferred embodiment.
Figure 10:
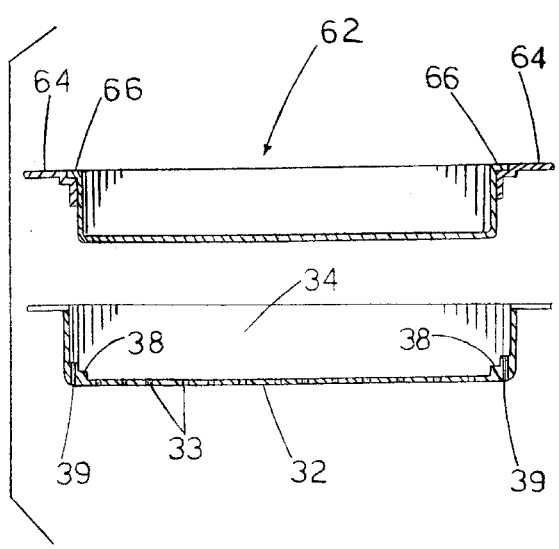
FIG. 10 shows the corresponding cross-sectional views along lines 10—10 and 10'—10' of FIG. 9.
Figure 9:
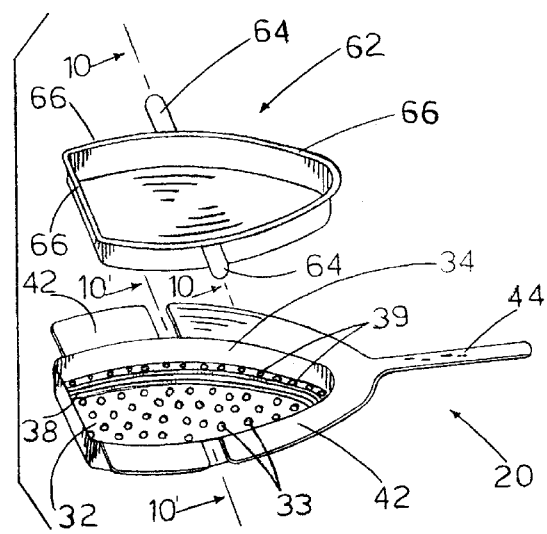
FIG. 9 is a fragmentary exploded perspective view of the components of the perforated preferred embodiment of FIG. 8.

The Preferred Embodiment with a Perforated Bottom—FIGS. 8, 9, and 10

FIG. 8 is an isometric view of the main component of the preferred embodiment with a perforated bottom, FIG. 9 is a fragmentary exploded perspective view of the components shown in FIG. 8, and FIG. 10 shows the corresponding cross-sectional views taken along lines 10—10 and 10"—10" of FIG. 9. This preferred embodiment has a bottom 32 with a multiplicity of holes 33, and further comprises a two-step scale 38, integrally formed with receptacle 30, that runs along all the inner boundary where bottom 32 joins wall 34. Moreover, this embodiment further comprises one non-perforated removable receptacle 62 in which a rim 66 of predetermined and uniform width extends along the upper edge of, is orthogonal to, and projects outwards from its side wall.

The highest step of scale 38 has a multiplicity of vertically oriented cylindrical voids 39 while the height and width of each step are both about 3 mm. or ⅛". Also, the width of rim 66 equals or slightly exceeds the width of any step of scale 38. The shape of receptacle 62 is congruent with the structure of receptacle 30 and scale 38. More specifically, when removable receptacle 62 is in a stable position within receptacle 30, its bottom rests on top of the lowest step of scale 38, is parallel to bottom 32, and leaves a gap or void between both bottoms whose size equals the height of the lowest step of scale 38. Furthermore, when receptacle 62 is so placed, its wall remains parallel to wall 34, leaving also a gap or void between both walls covered from above by rim 66. Finally, the transverse size of this last gap equals the width of the highest step of scale 38. Thereby, these gaps act as heat jackets that surround most of the outer surface of receptacle 62 when the steam coming from pot 95 enters the jackets through all holes 33 and 39.

Receptacle 62 has a couple of ears 64 connected to its wall so that the cook can handle it when it is inserted into receptacle 30. Flange 42 has essentially the same structure of the flange of the non-perforated preferred embodiment except for two voids whose size and position are congruent with the size and position of each ear 64 when receptacle 62 is in position into receptacle 30. Finally, the perforated preferred embodiment has the advantage that the whole utensil, except receptacle 62, is preferably made of heat-resistant plastic, thereby being lighter to use and cheaper to produce than embodiments totally made of metallic materials. Hence, FIG. 8 shows that handle 44 is integrally formed with flange 42.

Figure 11:
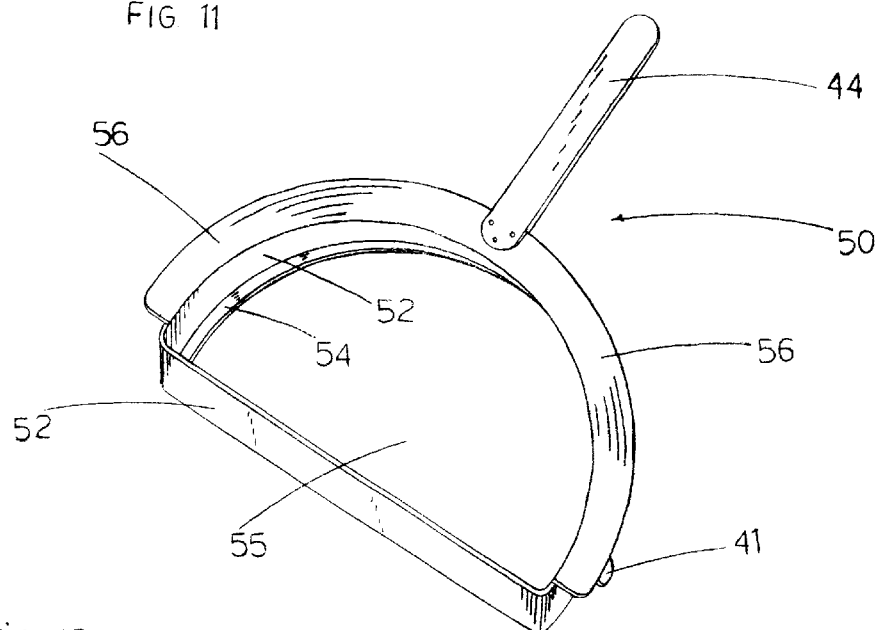
FIG. 11 is an isometric view of an enclosing brace of one variant of the perforated preferred embodiment.
Figure 12:
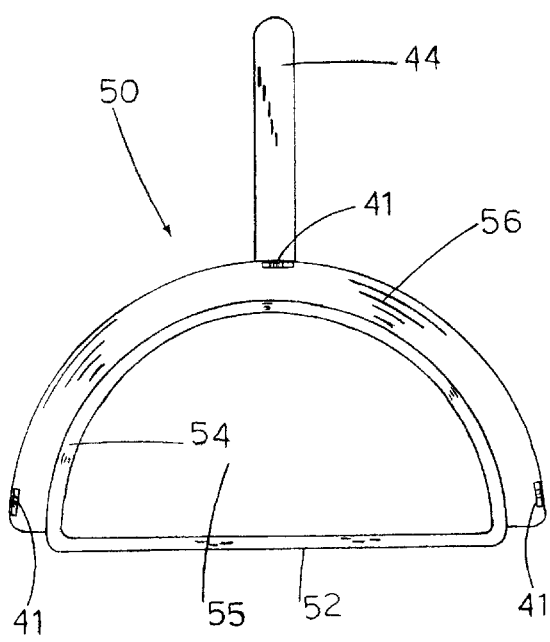
FIG. 12 is a bottom view of the enclosing brace.
Figure 13:
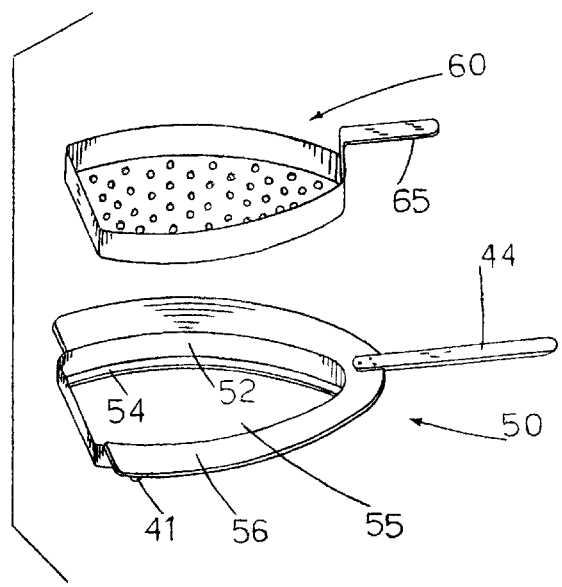
FIG. 13 is a fragmentary exploded perspective view of the components of the enclosing brace variant.

Variant of the Perforated Preferred Embodiment—FIGS. 11, 12, and 13

FIG. 11 is an isometric view of an enclosing brace of one possible variant of the perforated preferred embodiment, FIG. 12 is a bottom view of the enclosing brace, and FIG. 13 is a fragmentary exploded perspective view of the components of such variant. This variant comprises at least one perforated removable receptacle 60, at least one non-perforated removable receptacle 62 (not shown but otherwise identical to receptacle 60 except for the multiplicity of holes present in the bottom therein), and an enclosing brace 50. This enclosing brace further comprises an enclosing wall 52, a lip 54, a void 55, and a salient or flange 56. Obviously, handle 44 is attached to brace 50. The structure of enclosing brace 50 is essentially identical to the structure of the non-perforated preferred embodiment, except that the bottom of the receptacle thereof has been replaced by lip 54 and void 55 so that the resulting structure acts as a template or receptacle for the insertion of either one of receptacles 60 or 62. More specifically, lip 54 has a uniform width, and extends along the lower edge of wall 52. Also, lip 54 projects radially inward from enclosing wall 52 so that either receptacle 60 or 62 can rest on lip 54 and void 55 while embraced by enclosing wall 52. These receptacles have a handle 65 that allows the cook to handle them when being inserted into brace 50. Handle 65 has an L-shape and is preferably connected to the inner surface of the wall of the corresponding receptacle 60 or 62. Obviously, flange 56 has essentially the same structure of flange 42 of the non-perforated preferred embodiment.

Alternative Support Means: U-bracket—FIGS. 14 and 15

Figure 14:
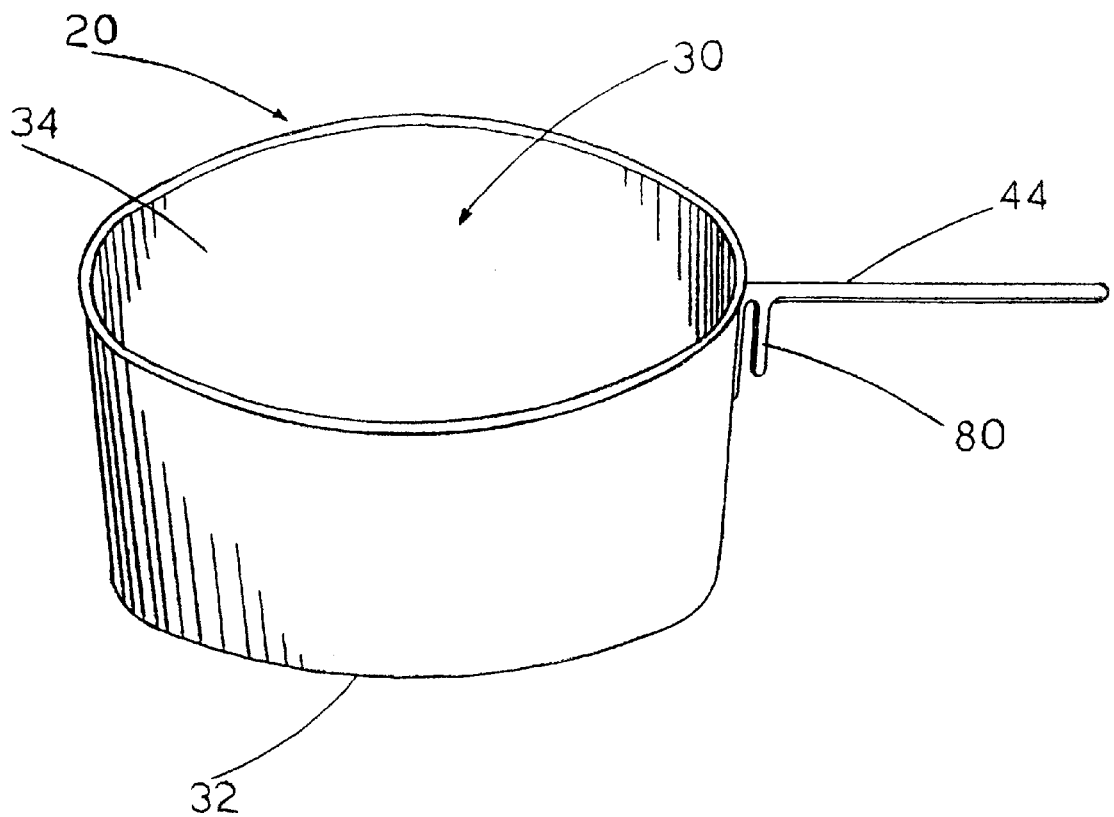
FIG. 14 is a perspective view of a U-bracket embodiment.
Figure 15:
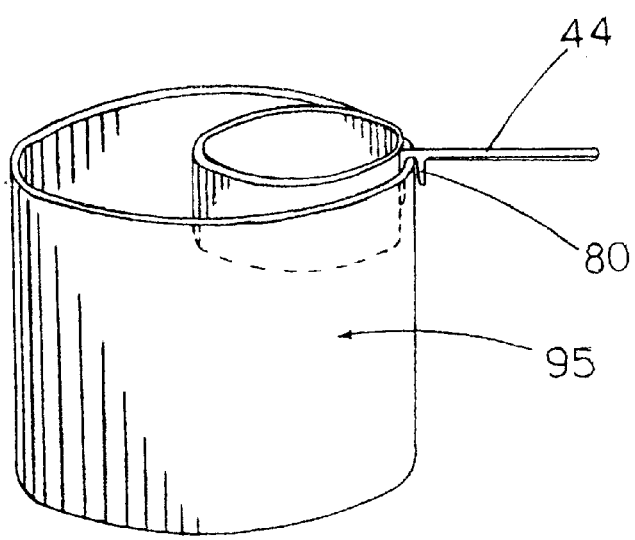
FIG. 15 is a perspective view of the U-bracket embodiment in operation.

FIG. 14 is a perspective view of a U-bracket embodiment, and FIG. 15 is a perspective view of this embodiment when used on top of pot 95. In this embodiment, there is a clamping means, downwardly facing U-shaped bracket, or U-bracket 80 attached to and overhanging from the under surface of handle 44 and connected to the outer surface of wall 34. This embodiment is congruent with a given pot 95 when and if the size of the U-gap of U-bracket 80 slightly exceeds the effective thickness of the side wall of pot 95. This wall may not be substantially vertical at its top edge, thereby increasing its effective thickness for insertion into the U-gap of U-bracket 80. Receptacle 30 shown in FIGS. 14 and 15 has a circular bottom 32, which obviously can be a chord-truncated one as well, according to the preferred embodiments specified previously.

SUMMARY, RAMIFICATIONS, AND SCOPE.

Our new and improved cooking utensil comprises a chord-truncated circular shape of predetermined radius, and can be flexibly used either as a pan or as a top pot to gently cook edible substances while simultaneously boiling another in the pot below. When used as a top pot or steamer, the cook has visibility and access to the pot below, with the consequent advantages that derive from such access. The utensil has a remarkably simple structure whose capacity is made as large as desired without voiding access to the pot below and without increasing the above radius.

Additional advantages are that when used as a top pot, it permits the gentle heating of about 650 ml or 3 cups of tomato sauce from about 10° C. up to about 40° C. in a time interval of about 10 minutes, provided the sauce is stirred a few times during the process;

when used as a top pot, it permits the gentle heating of previously cooked soup;

when used as a top pot, it saves burners of the stove, an advantage particularly convenient in the preparation of large meals;

when used as a top pot, it reduces entropy increases and energy waste, benefits particularly appreciated by environmentally conscious people.

it saves money in electricity or gas bills, not only because the cook uses only one burner but also because the water in the pot underneath can be kept in a boiling state using less power than it would be needed otherwise if the pot were completely uncovered, this benefit is addressed to the low and middle-income segment of the world's population;

its dimensions can easily be adapted by the manufacturer so that it can be used in the corresponding camping situation;

it can be marketed at reasonable prices when mass-produced;

it can be marketed as a luxury item under a prestigious brand name when it is manufactured with top-quality cookware materials, an elegant design, and a handsome finish;

its novel structure in such a crowded art is likely to appeal to most people; and, given all the above benefits and advantages, its inclusion as a member of a conventional cookware set enhances the commercial value of such set.

Figure 16:
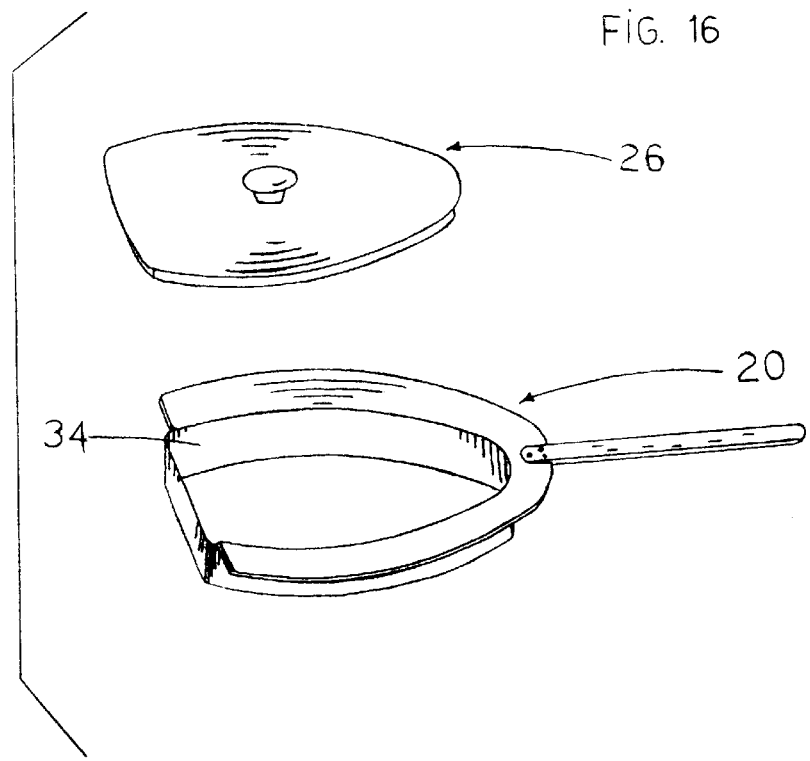
FIG. 16 is a perspective view of the steamer pan of FIG. 1, further comprising a lid.
Figure 17:
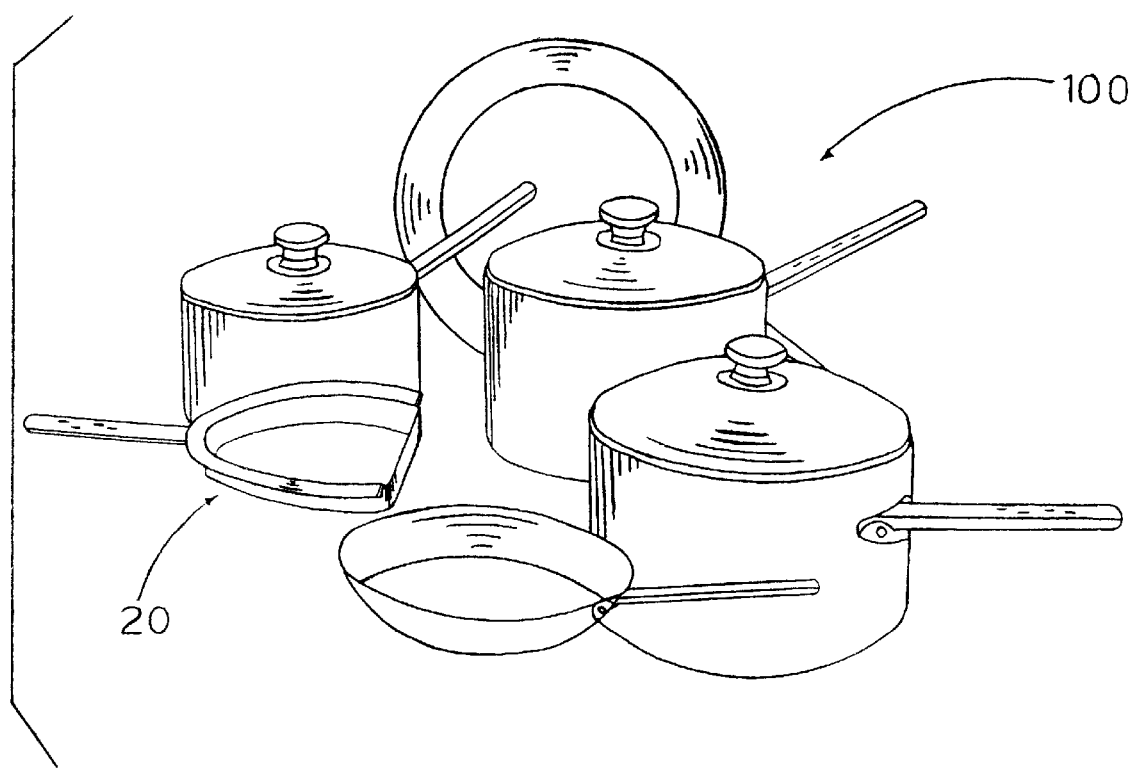
FIG. 17 is a perspective view of the steamer pan of FIG. 1, further comprising pots, pans, and the like of commercially available cookware sets.

While our above description contains many details, these should not be construed as limitations on the scope of the invention, but rather as an exemplification of the embodiments thereof. Many other variations are possible. For example, utensil 20 may further comprise: (a) a typical pot 95 (see FIGS. 3, 6A, and 6B, for example), (b) a lid 26 congruent to the shape of the top edge of wall 34 (see FIG. 16), and (c) pots, pans, and the like of a typical cookware set 100 (see FIG. 17), thereby enhancing its status and commercial value by differentiation against all the other sets that lack the utensil. The practical advantage of such enhanced set is that the utensil can be used not only as a pan but also on top of either one of the two pots with different diameters, like a casserole and a stock pot, that usually come with cookware sets.

Another variant of the perforated preferred embodiment, in the same spirit of the one shown in FIGS. 11, 12, and 13, eliminates lip 54 and wall 52. Furthermore, it adds a rim to the top edge of the curved portion of the walls of receptacles 60 and 62. In this way, the receptacles are supported by the rim, which rests on top of flange 56. Note that, having eliminated wall 52, we need to place one upward protuberance at each of the truncated edges of flange 56 so that receptacles 60 and 62 are supported in a mechanically stable manner by enclosing brace 50 (the protuberances constrain the rim of the receptacles to a fixed position once the rim is resting on top of flange 56). The advantages of this variation over the one shown in FIGS. 11, 12 and 13, are: (a) one can have several receptacles 60 or 62 with different heights (different capacities), (b) the enclosing brace and the handle form a substantially flat structure, and (c) such structure can be made in only one piece of heat resistant plastic.

Preferably, the flat portion of the wall of the receptacles shall further comprise a pouring lip to facilitate dislodging of sauces, soups and the like. The flat portion of the wall of the receptacle may be slightly curved so that it facilitates dislodging by the pouring lip. Furthermore, it is preferable, for ease of cleaning, to have a smooth surface instead of the edges where such formerly flat portion joins the corresponding curved portion of such wall. The handle should have a hole so that the utensil can be hung on a hook of a kitchen racket The comers of the flange should be smoothed to reduce the chance of an accidental injury. The layer of each material that form the receptacle can be varied so that the resultant thermal conductance is improved. The flanges or salients may be attached to the receptacle instead of being integrally formed thereto. The receptacle may have either fixed or removable partitions and a partially perforated bottom. The enclosing brace may hold more than one additional receptacle simultaneously, which may be connected to a handle or other suitable handling means instead of two ears. The height of the receptacle may be increased to make it more pot-like than pan-like. The perforated preferred embodiment may have a plurality of scales instead of only one scale provided the size and number of scales permit the mechanical stability of the containers when inserted within the receptacle. Scales, and their corresponding voids, can be added to the enclosing brace variant of the perforated preferred embodiment The scale can be eliminated altogether in the version with a perforated bottom. The shape of the bottom of the receptacle can be irregular provided its perimeter has a circular arc portion and the whole utensil is mechanically stable when placed on top of a pot. Finally, note that protuberances 41 shown in FIG. 5A can be substituted by a downward edge or protuberance identical (except for direction) to upside edge 45 shown in FIG. 5C.

The U-bracket may further comprise a sliding-means so that the size of the corresponding U-gap can be adjusted manually by the user so that it is not restricted to an outer pot of given thickness. The U-bracket with such sliding-means may further comprise a fastening-means so that the U-gap remains reliably fixed. The U-bracket can be substituted by any other type of clamping means, for example, a clip-like support-means.

Finally, many other permutations, deletions, substitutions, additions, and modifications are possible without departing from the essential structure and operation of the invention. Accordingly, the scope of the invention should be determined, not by the embodiments illustrated and the examples given, but by the appended clams and their legal equivalents.

We claim:

1. A cooking utensil comprising:
    (a) a receptacle, said receptacle having a volume capacity, said receptacle comprising a bottom wall, and a side wall joined to said bottom wall, said side wall having a top edge, said top edge having a predetermined shape, said predetermined shape being substantially a chord-truncated circular shape, said predetermined shape having a predetermined first radius, said predetermined shape having a predetermined first area, said predetermined first area being larger than a semi-circular area having the first radius, so that when said cooking utensil can be inserted on top of an ordinary pot, said receptacle and said ordinary pot define passageway means for attaining access to said ordinary pot, and
    (b) support means for supporting said receptacle in stable mechanical equilibrium on top of said ordinary pot, said support means being connected to said side wall, whereby, when a human uses said cooking utensil on top of said ordinary pot, said cooking utensil and said ordinary pot define a multi-compartment cooking vessel that is able to carry out the following two processes simultaneously, boiling of either water, or of water and a first edible substance or food in the ordinary pot, said boiling producing a steam or water vapor phase, and heating of a second edible substance in the utensil using said steam, said multi-compartment cooking vessel having all the benefits of steam cooking and boil cooking plus a plurality of advantages (I) concomitant to the passageway means, said plurality of advantages attained without said human lifting said cooking utensil from said ordinary pot, and comprising (I.1) said human being able to effectively stir said food in said ordinary pot, (I.2) said human being able to control the risk of having water spill from said ordinary pot by adjusting the power source, (I.3) said human being able to add other edible substances to said ordinary pot during the boiling, and whereby said human gets an additional advantage (II) of a volume capacity not restricted unnecessarily, for said predetermined area is larger than the semi-circular area, yet the passageway means provides access to the ordinary pot, with advantages (I) concomitant thereto.

2. The cooking utensil of claim 1 wherein said bottom does not have any holes, and wherein said utensil is made of at least one thermally conducting material selected from the group consisting of sheet-metal, stainless-steel, aluminum, and copper, whereby said utensil has an additional advantage (III) of flexible use, either as a pan placed directly on top of a second power source of said stove, or as a top pot or steamer placed on top of said ordinary pot.

3. The cooking utensil of claim 2 further including a first cookware set, said first cookware set comprising a plurality of conventional pots and pans, whereby a second cookware set, consisting of said cooking utensil and said first cookware set, has an enhanced functionality over said first cookware set, said enhanced functionality originating from the inheritance of advantages (I), (II), and (III) by said second cookware set from said cooking utensil, meanwhile said first cookware set does not have said enhanced functionality, even if said first cookware set further includes another conventional pan.

4. The cooking utensil of claim 2 wherein said support means comprises at least one flange, said flanges projecting outward from said side wall along the whole curved portion thereof, said flanges being parallel to said bottom, said flanges having a predetermined and uniform width, said flanges having a plurality of downward pointing protuberances.

5. The cooking utensil of claim 4 wherein said support means comprises only one flange, said flange having an upside protruding edge and a sulcus, said upside protruding edge extending along all the radially outermost part of the flange, said sulcus being equidistant and in substantial proximity to said wall, said sulcus having an upward concavity and a plurality of holes.

6. The cooking utensil of claim 2 further including said ordinary pot, said ordinary pot having a circular top edge, said circular top edge having a second radius, said second radius being larger than said first radius, whereby a first combination set, consisting of said cooking utensil and said ordinary pot, has an enhanced functionality over a second combination set, said second combination set consisting of an ordinary pan and said ordinary pot, said enhanced functionality originating from the inheritance of advantages (I), (II), and (III) by said first combination set from said cooking utensil, meanwhile said second combination set does not have said enhanced functionality, for said ordinary pan does not have advantages (I), (II), and (III).

7. The cooking utensil of claim 6 wherein said support means are integrally formed to said side wall, said support means comprising a horizontal bulge projecting outward from said side wall along the whole curved portion thereof, said bulge having a predetermined size.

8. The cooking utensil of claim 6 wherein said support means are integrally formed to said side wall, said support means comprising a ledge or step-like shape projecting outward from said side wall along the whole curved portion thereof, the step of said ledge having a predetermined size.

9. The cooking utensil of claim 6 further including a pasta colander insert, said utensil capable of being inserted on top of said colander, said colander capable of being inserted on top of said ordinary pot, whereby a third combination set, consisting of said cooking utensil, said ordinary pot, and said colander insert, has an enhanced functionality over a fourth combination set, said fourth combination set consisting of said ordinary pan, said ordinary pot, and said colander insert, said enhanced functionality originating from the inheritance of advantages (I), (II), and (III) by said third combination set from said cooking utensil, meanwhile said fourth combination set does not have said enhanced functionality, for the combination of said ordinary pan, said ordinary pot, and said colander insert does not have advantages (I), (II), and (III).

10. The cooking utensil of claim 1 wherein said bottom comprises a plurality of openings, and wherein said cooking utensil is made of at least one material selected from the group consisting of sheet-metal, stainless-steel, aluminum, copper, and heat resistant plastic.

11. The cooking utensil of claim 10 further comprising at least one removable container, said containers being congruent to said receptacle, said containers being open, and made of at least one material selected from the group consisting of sheet-metal, stainless-steel, aluminum, and copper, and wherein said receptacle has at least one two-step scale adjacent to said side wall and said bottom, said scale being on top of said bottom, the highest step of said scale having a plurality of cylindrical voids that also go through said bottom, the size of said scale being such that said bottom remains parallel to the bottom of each of said containers whenever one or more of said containers are resting within said receptacle in stable mechanical equilibrium on top of the first step of said scale, the wall of each of said containers being adjacent to the wall of the second step of said scale, the dimensions of the steps being such that there is a gap between said bottom and the bottom of each of said containers, and between said wall and the wall of each of said containers, the size of said scale being such that said bottom remains parallel to the bottom of each of said containers.

12. The cooking utensil of claim 10 wherein said receptacle has at least one two-step scale adjacent to said side wall and said bottom, said scale being on top of said bottom, the highest step of said scale having a plurality of cylindrical voids that also go through said bottom.

13. The cooking utensil of claim 10 wherein said support means comprises at least one flange, said flanges projecting outward from said side wall along the whole curved portion thereof, said flanges being parallel to said bottom, said flanges having a predetermined and uniform width, said flanges having a plurality of downward pointing protuberances.

14. The cooking utensil of claim 13 wherein said support means comprises only one flange, said flange having an upside protruding edge and a sulcus, said upside protruding edge extending along all the radially outermost part of the flange, said sulcus being equidistant and in substantial proximity to said wall, said sulcus having an upward concavity and a plurality of holes.

15. The cooking utensil of claim 10 further including said ordinary pot, said ordinary pot having a circular top edge, said circular top edge having a second radius, said second radius being larger than said fist radius, whereby a first combination set, consisting of said cooking utensil and said ordinary pot, has an enhanced functionality over a second combination set, said second combination set consisting of an ordinary steamer and said ordinary pot, said enhanced functionality originating from the inheritance of advantages (I) and (II) by said first combination set from said cooking utensil, meanwhile said second combination set does not have said enhanced functionality, for said ordinary steamer does not have advantages (I) and (II).

16. The cooking utensil of claim 15 wherein said support means are integrally formed to said side wall, said support means comprising a horizontal bulge projecting outward from said side wall along the whole curved portion thereof, said bulge having a predetermined size.

17. The cooking utensil of claim 15 wherein said support means are integrally formed to said side wall, said support means comprising a ledge or step-like shape projecting outward from said side wall along the whole curved portion thereof, the step of said ledge having a predetermined size.

18. The cooking utensil of claim 1 wherein said support means comprises a downwardly facing U-shaped bracket.

19. The cooking utensil of claim 1 further including a lid, said lid being congruent to said top edge.

20. A cooking utensil, comprising:

(a) a receptacle, said receptacle having a volume capacity, said receptacle comprising a bottom wall, and a side wall joined to said bottom wall, said side wall having a top edge, said top edge having a predetermined shape, said predetermined shape being substantially a chord-truncated circular shape, said predetermined shape having a predetermined first radius, said predetermined shape having a predetermined first area, said predetermined first area being larger than a semi-circular area having the first radius, and (b) an enclosure for supporting said receptacle on top of an ordinary pot so that, when said cooking utensil can be inserted on top of said ordinary pot, said receptacle and said ordinary pot define passageway means for attaining access to said ordinary pot, said enclosure comprising an enclosing wall, a lip, and at least one flange, said enclosing wall being congruent to said side wall, said lip extending along the lower edge of, being orthogonal to, and projecting inwardly from said enclosing wall so that said receptacle can rest on top thereof, each of said flanges projecting radially outwardly from said enclosing wall along the curved portion thereof, said flanges being parallel to said lip, each flange having an uniform and predetermined width, said flanges comprising a plurality of downward pointing protuberances, whereby, when a human uses said cooking utensil on top of said ordinary pot, said cooking utensil and said ordinary pot define a multi-compartment cooking vessel that is able to carry out the following two processes simultaneously, boiling of either water, or of water and a first edible substance or food in the ordinary pot, said boiling producing a steam or water vapor phase, and heating of a second edible substance in the utensil using said steam, said multi-compartment cooking vessel having all the benefits of steam cooking and boil cooking plus a plurality of advantages (I) concomitant to the passageway means, said plurality of advantages attained without said human lifting said cooking utensil from said ordinary pot, and comprising (I.1) said human being able to effectively stir said food in said ordinary pot, (I.2) said human being able to control the risk of having water spill from said ordinary pot by adjusting the power source, (I.3) said human being able to add other edible substances to said ordinary pot during the boiling, and whereby said human gets an additional advantage (II) of a volume capacity not restricted unnecessarily, for said predetermined area is larger than the semi-circular area, yet the passageway means provides access to the ordinary pot, with advantages (I) concomitant thereto.

21. The cooking utensil of claim 20 wherein said enclosure comprises only one flange, said flange having an upside protruding edge and a sulcus, said upside protruding edge extending along all the radially outermost part of the flange, said sulcus being equidistant and in substantial proximity to said wall, said sulcus having an upward concavity and a plurality of holes.

22. The cooking utensil of claim 20 wherein said bottom comprise a plurality of openings, and wherein said cooking utensil is made of at least one material selected from the group consisting of sheet-metal, stainless-steel, aluminum, copper, and heat resistant plastic.

23. The cooking utensil of claim 20 wherein said bottom does not have any holes, and wherein said utensil is made of at least one thermally conducting material selected from the group consisting of sheet-metal, stainless-steel, aluminum, and copper.

24. The cooking utensil of claim 20, further comprising at least one additional receptacle or container, each of said containers being congruent to said receptacle, each of said containers being open, removable, and made of at least one material selected from the group consisting of sheet-metal, stainless-steel, aluminum, and copper.

25. The cooking utensil of claim 20 wherein said enclosure comprises a downwardly facing U-shaped bracket attached thereto.

\* \* \* \* \*